(12) United States Patent
Golden et al.

(10) Patent No.: US 11,845,701 B2
(45) Date of Patent: Dec. 19, 2023

(54) EBC LAYER CONTAINING BORON

(71) Applicant: Rolls-Royce Corporation, Indianapolis, IN (US)

(72) Inventors: Robert Alexander Sean Golden, Noblesville, IN (US); Adam Lee Chamberlain, Mooresville, IN (US); Gregory John Kenneth Harrington, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 413 days.

(21) Appl. No.: 16/934,722

(22) Filed: Jul. 21, 2020

(65) Prior Publication Data
US 2022/0024827 A1 Jan. 27, 2022

(51) Int. Cl.
*C04B 35/80* (2006.01)
*C04B 41/00* (2006.01)
(Continued)

(52) U.S. Cl.
CPC ............ *C04B 41/009* (2013.01); *C04B 35/00* (2013.01); *C04B 35/16* (2013.01); *C04B 35/71* (2013.01);
(Continued)

(58) Field of Classification Search
CPC . C04B 41/009; C04B 41/5024; C04B 41/522; C04B 41/89; C04B 35/00; C04B 35/16; C04B 35/71; C04B 35/78; C04B 35/80; C04B 2111/00405; C04B 41/52; F01D 5/284; F01D 5/288; F01D 9/04; F01D 25/005; F23R 3/007; Y10T 428/31504; C23C 4/134; C23C 4/18; C23C 4/12; C23C 28/00; C23C 28/30; C23C 28/345; C23C 28/04
See application file for complete search history.

(56) References Cited

U.S. PATENT DOCUMENTS 6,777,093 B1   8/2004   Ojard et al.
8,940,417 B2   1/2015   Courcot et al.
(Continued)

FOREIGN PATENT DOCUMENTS

EP    3153487 A1      4/2017
WO    2018/052741 A1  3/2018
WO    2021/176164 A1  9/2021

OTHER PUBLICATIONS

Extended Search Report from counterpart European Application No. 21183286.0 dated Dec. 15, 2021, 9 pp.
(Continued)

*Primary Examiner* — Humera N. Sheikh
*Assistant Examiner* — Kevin Ct Li
(74) *Attorney, Agent, or Firm* — Shumaker & Sieffert, P.A.

(57) ABSTRACT

The disclosure describes articles having coating systems configured to inhibit or prevent crystallization of TGO at the operating temperature of the article. An article includes a substrate defining a surface; a bond coat on the surface of the substrate; a coating layer that includes a boron dopant configured to inhibit crystallization of amorphous silicon dioxide thermally grown oxide on the bond coat at an operating temperature of the article. By inhibiting or preventing TGO crystallization, the described coating systems may increase a useable life of the component.

17 Claims, 5 Drawing Sheets

(51) Int. Cl.
  *C04B 41/50* (2006.01)
  *C04B 41/52* (2006.01)
  *C04B 41/89* (2006.01)
  *C04B 35/71* (2006.01)
  *C04B 35/78* (2006.01)
  *C04B 35/16* (2006.01)
  *C04B 35/00* (2006.01)
  *F01D 5/28* (2006.01)
  *F01D 9/04* (2006.01)
  *F01D 25/00* (2006.01)
  *F23R 3/00* (2006.01)
  *C04B 111/00* (2006.01)

(52) U.S. Cl.
  CPC .............. *C04B 35/78* (2013.01); *C04B 35/80* (2013.01); *C04B 41/5024* (2013.01); *C04B 41/522* (2013.01); *C04B 41/89* (2013.01); *C04B 2111/00405* (2013.01); *F01D 5/284* (2013.01); *F01D 9/04* (2013.01); *F01D 25/005* (2013.01); *F23R 3/007* (2013.01); *Y10T 428/31504* (2015.04)

(56) References Cited

U.S. PATENT DOCUMENTS

| 10,214,456 | B2 | 2/2019 | Kirby et al. | |
|---|---|---|---|---|
| 2004/0234740 | A1 | 11/2004 | Ojard et al. | |
| 2004/0234784 | A1 | 11/2004 | Eaton et al. | |
| 2010/0129636 | A1* | 5/2010 | Cybulsky | C23C 30/00 427/447 |
| 2010/0154422 | A1 | 6/2010 | Kirby et al. | |
| 2014/0162027 | A1* | 6/2014 | Meschter | C04B 41/009 427/258 |
| 2014/0261080 | A1* | 9/2014 | Lee | C23C 14/30 427/596 |
| 2017/0101348 | A1* | 4/2017 | Wan | C04B 41/5006 |
| 2017/0218779 | A1 | 8/2017 | Luthra et al. | |
| 2018/0079687 | A1* | 3/2018 | Kirby | C04B 41/5096 |
| 2018/0079689 | A1 | 3/2018 | Kirby et al. | |

OTHER PUBLICATIONS

Lee, "Yb2Si2O7 Environmental barrier coatings with reduced bond coat oxidation rates via chemical modifications for long life", Journal for American Ceramic Society, Jul. 2018, 15 pgs.

Response to Extended Search Report dated Dec. 15, 2021, from counterpart European Application No. 21183286.0 filed Jul. 26, 2022, 10 pp.

Lamkin et al., "Oxygen Mobility in Silicon Dioxide and Silicate Glasses: a Review", State of the Art, Journal of the European Ceramic Society 10, Jul. 3, 1991, 21 pp.

Lee et al., "Yb2SiO7 Environmental barrier coatings with reduced bond oxidation rates via chemical modifications for long life", Journal of Amercian Ceramic Society, Jul. 19, 2018, 15 pp.

* cited by examiner

FIG. 5 ically graded coating layer having a boron dopant.
EBC LAYER CONTAINING BORON

TECHNICAL FIELD

The present disclosure generally relates to environmental barrier coatings.

BACKGROUND

Ceramic or ceramic matrix composite (CMC) materials may be useful in a variety of contexts where mechanical and thermal properties are important. Ceramic or CMC materials may be resistant to high temperatures, but some ceramic or CMC materials may react with some elements and compounds present in the operating environment of high temperature mechanical systems, such as water vapor. Reaction with water vapor may result in the recession of the ceramic or CMC material. These reactions may damage the ceramic or CMC material and alter mechanical properties of the ceramic or CMC material, which may reduce the useful lifetime of the component. Thus, in some examples, a ceramic or CMC material may be coated with an environmental barrier coating (EBC), which may reduce exposure of the substrate to elements and/or compounds present in the operating environment of high temperature mechanical systems.

SUMMARY

The disclosure describes coating systems that include a boron doped EBC or borate layer on a silicon containing bond coat and/or substrate. The disclosed coating system may inhibit or prevent crystallization of TGO at the operating temperature of the component. By inhibiting or preventing TGO crystallization, the described coating systems may increase a useable life of the component.

In some examples, the disclosure describes an article that includes a substrate defining a surface; a bond coat on the surface of the substrate; and a coating layer on the bond coat. The coating layer includes a boron dopant configured to inhibit crystallization of amorphous silicon dioxide thermally grown oxide on the bond coat at an operating temperature of the article.

In some examples, the disclosure describes a coating system of a gas turbine engine component that includes a bond coat on a surface of a ceramic matrix composite defining the gas turbine engine component; and a coating layer on the bond coat. The coating layer includes a boron dopant. The boron dopant is configured to inhibit crystallization of amorphous silicon dioxide thermally grown oxide on the bond coat at an operating temperature of the article.

In some examples, the disclosure describes a method that includes depositing a bond coat on a surface of a substrate defining an article; and depositing a coating layer on the bond coat. The coating layer includes a boron dopant configured to inhibit crystallization of amorphous silicon dioxide thermally grown oxide on the bond coat at an operating temperature of the article.

DETAILED DESCRIPTION

The disclosure describes coating systems that include a coating layer having a boron dopant on a silicon containing bond coat and/or substrate. In some examples, the coating system may be on a substrate, such as a ceramic or ceramic matrix composite (CMC) substrate, defining a component of a high temperature mechanical system, such as a gas turbine engine component. The bond coat may be on the substrate to improve adhesion of overlaying layers of the coating system, such as an environmental barrier coating (EBC). During operation the component may be exposed to combustion gases. Elements and compounds present in the combustion gases may react with or degrade a portion of the coating system (e.g., bond coat or an EBC of the coating system). For example, during operation, amorphous silicon dioxide thermally grown oxide (TGO) may form on a silicon bond coat. The TGO may crystallize, for example, after prolonged exposure to high temperatures and repeated thermal cycling events of the CMC component. The crystallized TGO may crack due to the β to α-cristobalite transformation. The cracked TGO may result in spallation of a coating system, for example, the EBC or other coating layers overlying the bond coat.

The disclosed coating system may inhibit or prevent crystallization of TGO at the operating temperature of the component. Inhibiting crystallization of TGO may include at least one of slowing a rate of TGO formation or slowing a rate of TGO crystallization relative to a coating system without a coating layer having boron dopant that overlies the bond coat and/or substrate. The operating temperature of the component may include an operating temperature range of a high temperature mechanical component, such as a gas turbine engine component. For example, the operating temperature may include temperatures up to about 3600° F. (1982° C.), up to about 3000° F. (1649° C.), up to about 2700° F. (1482° C.), up to about 2500° F. (1371° C.), or up to about 2400° F. (1316° C.).

Without being bound to any particular theory, it is believed that a coating layer having a boron dopant may supply TGO (e.g., amorphous silicon dioxide) with a selected amount of boron which alters the TGO crystallization temperature regime. The TGO crystallization temperature regime may include the temperatures ($T_1$) at which amorphous TGO grows (e.g., $T_1 < T_G$) and/or the temperatures ($T_2$) at which TGO crystallizes (e.g., $T_G < T_2 < T_X$), which may include a peak TGO crystallization. Controlling the TGO crystallization temperature regime may include, for example, moving the peak TGO crystallization temperature outside an operating temperature range that a component operates at for a large percentage of its life.

In examples in which the article includes a gas turbine engine component, the selected temperature range may include a temperature range at cruising conditions, e.g., conditions at which the engine spends the majority of its life. In this way, the peak TGO crystallization temperature may be tuned so that it is greater or less than the temperature range at cruising conditions. By inhibiting or preventing TGO crystallization, the described coating systems may increase a useable life of the component.

Although the disclosure describes coating systems including EBCs, in other examples, the subject matter described herein may be applied to coatings of other types, such as abradable coatings, abrasive coatings, thermal barrier coatings, self-lubricating coatings, or the like. The layer structure and compositions may differ for these different types of coatings, but one or more coating layers including a boron dopant may be used in these other coating systems.

Figure 1:
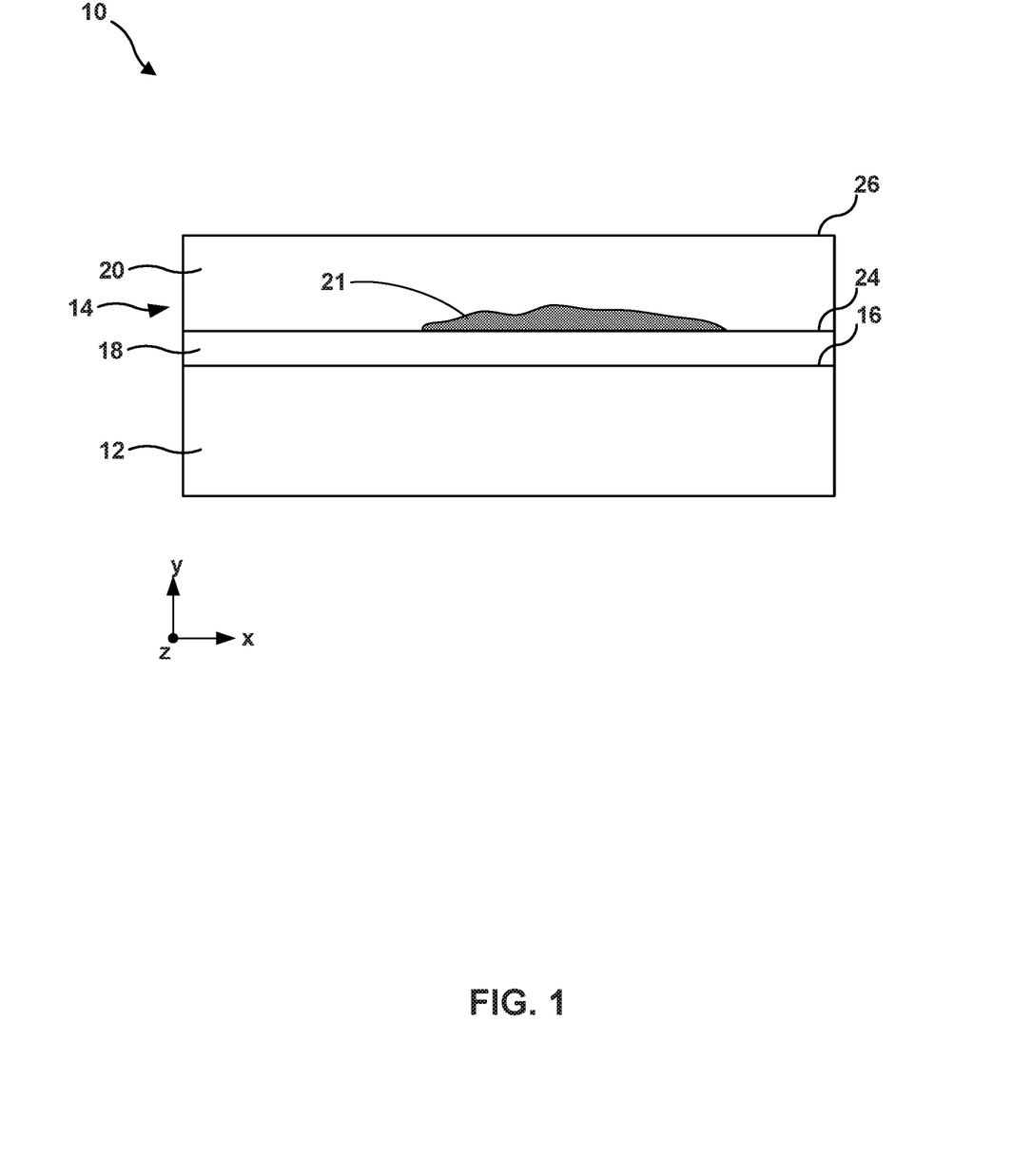
FIG. 1 is a conceptual diagram illustrating a cross-sectional view of an example article that includes a substrate and a coating system that includes a coating layer having a boron dopant.

FIG. 1 is a conceptual diagram illustrating a cross-sectional view of an example article 10 that includes a substrate 12 and coating system 14. Substrate 12 defines a surface 16. Coating system 14 may include a bond coat 18 and coating 20. Bond coat 18 may include a silicon-based bond coat. In some examples, bond coat 18 is directly on surface 16 of substrate 12. Coating 20 may be directly on a surface 24 of bond coat 18. Coating system 14 (e.g., coating 20) may define an outer surface 26. Coating 20 may include at least one of an environmental barrier coating (EBC) including the boron dopant or borate-based coating layer.

Article 10 may be a component of a high temperature mechanical system. For example, article 10 may be a blade track, a blade shroud, an airfoil, a blade, a vane, a combustion chamber liner, an engine hot section component, or the like, of a gas turbine engine.

Substrate 12 may include a ceramic or a ceramic matrix composite (CMC). For example, substrate 12 may include a silicon-containing ceramic or CMC having a silicon-containing ceramic, such $SiO_2$, silicon carbide (SiC), or silicon nitride ($Si_3N_4$); aluminum oxide ($Al_2O_3$); aluminosilicates (e.g., $Al_2SiO_5$); combinations thereof; or the like. In examples in which substrate 12 includes a ceramic, the ceramic may be substantially homogeneous.

In examples in which substrate 12 includes a CMC, substrate 12 may include a matrix material and a reinforcement material. The matrix material may include a ceramic material, such as, for example, SiC, $Si_3N_4$, $Al_2O_3$, aluminosilicates, $SiO_2$, combinations thereof, or the like. The reinforcement material may include discontinuous whiskers, platelets, or particulates; or continuous monofilament or multifilament weave. In some examples, the composition of the reinforcement material is the same as the composition of the matrix material. For example, a matrix material comprising silicon carbide may surround a reinforcement material comprising silicon carbide whiskers. In other examples, the reinforcement material includes a different composition than the composition of the matrix material, such as aluminosilicate fibers in an alumina matrix, or the like. One composition of a substrate 12 that includes a CMC includes a reinforcement material including silicon carbide continuous fibers embedded in a matrix material including silicon carbide. In some examples, substrate 12 may include a SiC—SiC CMC, in which a fibrous preform including SiC fibers is impregnated with SiC particles from a slurry, then melt infiltrated with silicon metal or a silicon alloy to form the melt-infiltrated SiC—SiC CMC.

In some examples, substrate 12 may include a metal alloy, a metal superalloy, a metal alloy that includes silicon. For example, substrate 12 may include a metal alloy that includes Si, such as a molybdenum-silicon alloy (e.g., $MoSi_2$) or a niobium-silicon alloy (e.g., $NbSi_2$).

In examples in which substrate 12 includes a Si-containing material, the Si in substrate 12 may react with an oxidizing species to form an amorphous silicon dioxide thermally grown oxide (TGO) layer 21. For example, TGO layer 21 may form on surface 16 of substrate 12 and/or surface 24 of bond coat 18, as illustrate in FIG. 1. The amorphous silicon oxide TGO layer 21 may crystallize and subsequently crack due to the β to α-cristobalite transformation, which may, in some examples, result in spallation of at least a portion of coating system 14.

As shown in FIG. 1, article 10 includes bond coat 18 on substrate 12. As used herein, "formed on" and "on" mean a layer or coating that is formed on top of another layer or coating, and encompasses both a first layer or coating formed immediately adjacent a second layer or coating and a first layer or coating formed on top of a second layer or coating with one or more intermediate layers or coatings present between the first and second layers or coatings. In contrast, "formed directly on" and "directly on" denote a layer or coating that is formed immediately adjacent another layer or coating, i.e., there are no intermediate layers or coatings.

Bond coat 18 may improve adhesion between substrate 12 and the layer overlying bond coat 18 (e.g., coating 20). Bond coat 18 may include any useful material that improves adhesion between substrate 12 and an overlying layer. In some examples, bond coat 18 may act as a protective layer that decreases migration of an oxidizing agent into substrate 12 by reacting with an oxidizing species to form a protective TGO layer 21. Bond coat 18 may have any suitable thickness. In some examples, a thickness of bond coat 18 may be within a range from about 25.4 micrometers (μm, about 0.001 inch) to about 254 μm (about 0.01 inch). In some examples, article 10 may not include a bond coat 18, and coating 20 may be formed directly on substrate 12.

In examples in which substrate 12 is a ceramic or CMC, bond coat 18 may include a silicon-based bond coat, and may include silicon metal (e.g., elemental silicon; Si), a silicon-containing alloy, a silicon-containing ceramic, or another silicon-containing compound. In some examples, the presence of Si in bond coat 18 may promote adherence between bond coat 18 and substrate 12 and between bond coat 18 and coating 20, such as, for example, when substrate 12, coating 20, or both, includes silicon metal or a silicon-containing alloy or compound. In some examples, during operation, Si in substrate 12 and/or bond coat 18 may form amorphous silicon dioxide TGO layer 21 on or near surfaces 16 and/or 24. As discussed above, the amorphous silicon oxide TGO layer 21 may crystallize and subsequently crack due to the β to α-cristobalite transformation, which may, in some examples, result in spallation of at least a portion of coating system 14, such as coating 20.

Bond coat 18 may be formed on substrate 12 using, for example, thermal spraying, plasma spraying, physical vapor deposition (PVD), electron beam physical vapor deposition (EB-PVD), directed vapor deposition (DVD), chemical vapor deposition (CVD), cathodic arc deposition slurry process deposition, sol-gel process deposition, electrophoretic deposition, or the like.

Coating 20 includes one or more layers of material configured to protect substrate 12 during operation of article 10. In some examples, coating 20 may include boron doped layer, such as a boron doped EBC and/or a borate layer. The boron doped layer of coating 20 may be configured to inhibit or prevent crystallization of TGO layer 21 at the operating temperature of article 10. In some examples, coating 20 also may be configured to reduce or substantially prevent attack of bond coat 18 and/or substrate 12 by chemical species present in the operating environment of article 10, e.g., the operating environment of a high temperature mechanical component. The operating environment of article 10 may include, for example, the intake gas, combustion gas, or exhaust gas of a gas turbine engine. In some examples, coating 20 may include a material that is resistant to oxidation or water vapor attack.

The boron doped coating layer of coating 20 may include $MBO_3$, $MBSiO_5$ and/or $MBSi_2O_7$ where M is a rare-earth metal (RE), aluminum (Al), hafnium (Hf), zirconium (Zr), tantalum (Ta), combinations thereof, or the like. As used herein, rare-earth metals (RE) may include one or more of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), or lutetium (Lu). In some examples, the $MBO_3$, $MBSiO_5$ and $MBSi_2O_7$ dopants may be selected to be substantially unreactive with RE silicates and $SiO_2$. In some examples, substantially unreactive may include, e.g., be limited to, chemical reactions or interactions that do not compromise and/or alter the mechanical properties or the chemical properties of coating system 14. In some examples, an amount of $MBO_3$, $MBSiO_5$ and/or $MBSi_2O_7$ in the boron doped coating layer may be within a range from about 0.1 mole percent (mol %) to about 15 mol %.

In some examples, the boron doped coating layer of coating 20 may include one or more optional second dopants. The one or more optional second dopants may include, for example, $Al_2O_3$, iron oxides (e.g., $Fe_2O_3$, $Fe_3O_4$), rare-earth oxides (e.g., $RE_2O_3$), tantalum pentoxide ($Ta_2O_5$), hafnium oxide ($HfO_2$), zirconium oxide ($ZrO_2$), lithium rare-earth metal oxides (e.g., $LiREO_2$), or combinations thereof. In some examples, an amount of a second dopant may be within a range from about 0.1 mol % to about 15 mol %.

In some examples, the one or more optional second dopants may be sintering aids configured to densify (e.g., reduce porosity) coating 20 and/or provide a more hermetic coating compared to coating 20 without the one or more optional second dopants. In this way, the one or more optional second dopants may reduce migration of elements or compounds (e.g., oxygen or water vapor) into coating 20.

Although boron additions to TGO layer 21 can enable one to control the temperature regime for crystallization, in some examples, boron additions may results in an increased growth rate of TGO layer 21. In some examples, the cations of the first dopant and/or the optional second dopant (e.g. RE, Al, Fe, Ta, Hf, Zr, Li, etc.) may be incorporated into the amorphous $SiO_2$ structure. Incorporation of the cations into the amorphous $SiO_2$ structure may, in some examples, slow the transport of $O_2$ (g) and $H_2O$ (g) through TGO layer 21. By slowing transport of $O_2$ (g) and $H_2O$ (g) through the TGO layer 21, the growth rate of TGO layer 21 may be reduced relative to a dopant having cations that do not incorporate into the amorphous $SiO_2$ structure.

In examples in which the boron doped coating layer of coating 20 includes an EBC, coating 20 may include, in addition to the first dopant and optional second dopant, an EBC material. The EBC material may include, for example, at least one of mullite; a glass ceramic such as barium strontium aluminosilicate ($BaO—SrO—Al_2O_3\text{-}2SiO_2$; BSAS), calcium aluminosilicate ($CaAl_2Si_2O_8$; CAS), cordierite (magnesium aluminosilicate), and lithium aluminosilicate; or one or more rare-earth silicates (silicates of Lu, Yb, Tm, Er, Ho, Dy, Tb, Gd, Eu, Sm, Pm, Nd, Pr, Ce, La, Y, or Sc). The rare-earth silicate may be a rare-earth monosilicate (e.g., $RE_2SiO_5$) and/or a rare-earth disilicate (e.g., $RE_2Si_2O_7$). In some examples, the rare-earth silicate may include two or more rare-earth metals. For example, the boron doped coating layer of coating 20 includes an EBC may include $(Yb_{0.5}Y_{0.5})_2—SiO_5$ and/or $(Yb_{0.5}Y_{0.5})_2—Si_2O_7$).

In some examples, the EBC may include an additive in addition to the primary constituents of the EBC. For example, the additive may include at least one of $TiO_2$, $HfSiO_4$, an alkali metal oxide, or an alkali earth metal oxide. The additive may be added to the EBC to modify one or more desired properties of the EBC. For example, the additive components may increase or decrease the reaction rate of the EBC with CMAS, may modify the viscosity of the reaction product from the reaction of CMAS and the EBC, may increase adhesion of the EBC to bond coat 18, may increase or decrease the chemical stability of the EBC, or the like.

In some examples, the EBC may be substantially free (e.g., free or nearly free) of hafnia and/or zirconia. Zirconia and hafnia may be susceptible to chemical attack by CMAS, so an EBC substantially free of hafnia and/or zirconia may be more resistant to CMAS attack than an EBC that includes zirconia and/or hafnia. However, as described above, in some examples, the EBC may include zirconia and/or hafnia as sintering aids.

In some examples, the EBC may have a coefficient of thermal expansion (CTE) that is close to substrate 12 and/or bond coat 18. For example, in examples where the EBC includes ytterbium disilicate ($Yb_2Si_2O_7$), bond coat 18 includes silicon (Si) metal, and substrate 12 includes silicon carbide (SiC), ytterbium disilicate may have a CTE of about $4.7 \times 10^{-6}$ °$C.^{-1}$, while silicon and silicon carbide may each have a CTE of about $4.5 \times 10^{-6}$ °$C.^{-1}$.

Regardless of the composition of coating 20, in some examples, coating 20 may have a dense microstructure, a porous microstructure, a columnar microstructure, a dense vertically cracked (DVC) structure, or a combination of at least two of dense, porous, or columnar microstructures. A dense microstructure may be more effective in preventing the infiltration of CMAS and other environmental contaminants, while a porous, DVC, or columnar microstructure may be more strain tolerant during thermal cycling. In some examples, coating 20 with a dense microstructure may have a porosity of less than about 10 vol. %, such as less than about 8 vol. %, less than about 5 vol. %, or less than about 2 vol. %, where porosity is measured as a percentage of pore volume divided by total volume of coating 20. In some examples, coating 20 with a porous microstructure may have a porosity of more than about 10 vol. %, such as more than about 15 vol. %, more than 20 vol. %, or more than about 30 vol. %, where porosity is measured as a percentage of pore volume divided by total volume of coating 20.

Coating 20 may be formed using any suitable technique, such as, for example, a thermal spray technique such as plasma spraying; PVD, such as EB-PVD or DVD; CVD; cathodic arc deposition; slurry deposition; sol-gel deposition; electrophoretic deposition; slurry casting; tape casting; gel casting; or the like. In some examples, coating 20 may be formed as a substantially non-porous layer. In other examples, coating 20 is formed as a layer that includes a plurality of cracks or pores. In some examples, coating 20 may define a thickness, measured in a direction substantially normal to surface 16 of substrate 12 within a range from about 25.4 μm (about 0.001 inch) to about 508 μm (about 0.02 inch).

In some examples, coating system 14 may include a plurality of layers, such as two or more of an EBC, an abradable coating, an abrasive coating, a thermal barrier coating (TBC), a self-lubricating coating, or other materials used for coating high temperature mechanical system components. At least one of the layers may be boron doped coating layer, e.g., a boron doped EBC and/or a borate layer.

Figure 2:
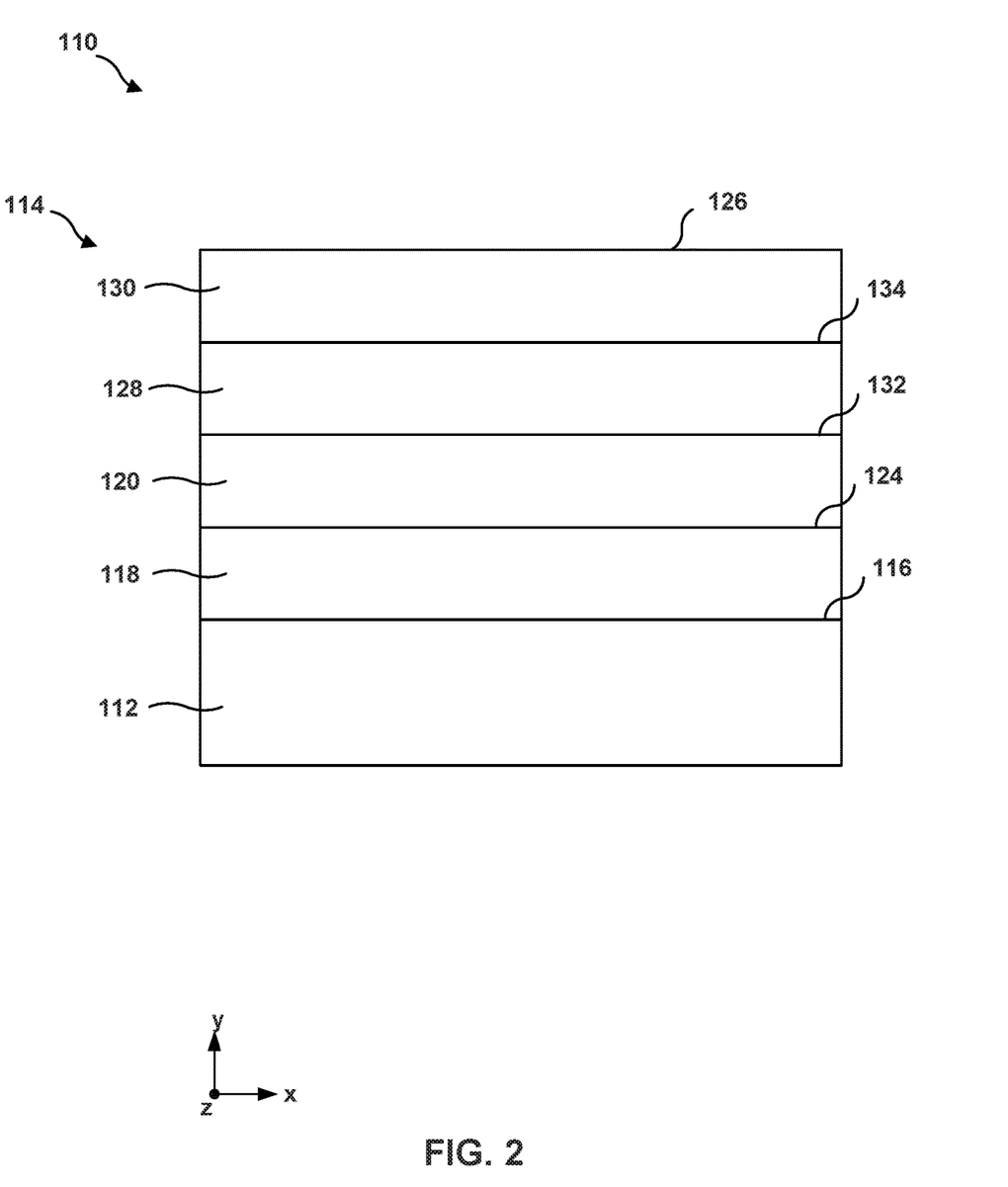
FIG. 2 is a conceptual diagram illustrating a cross-sectional view of an example article that includes a substrate and a coating system having a plurality of layers, at least one of which includes a boron dopant.

FIG. 2 is a conceptual cross-sectional diagram illustrating an example article 110 that includes coating system 114 having a plurality of layers. Article 110 may be the same as or substantially similar to article 10 described above in reference to FIG. 1, except for the differences described herein. For example, article 110 that includes a substrate 112, a bond coat 118 on a surface 116 of substrate 112, first coating layer 120 on a surface 124 of bond coat 118, a second coating layer 128 on surface 132 of first coating layer 120, and a third coating layer 130 on surface 134 of second coating layer 128. In the example illustrated in FIG. 2, first coating layer 120 includes a boron doped coating layer, for example, as described above in reference to FIG. 1. Although illustrated as having bond coat 118 and coating layers 120, 128, and 130, in other examples, coating system 114 may have few layers, e.g., bond coat 118 and coating layers 120 and 128, or additional layers, e.g., one or more additional coating layers overlying third coating layer 130.

Article 110 may include a bond coat 118 on substrate 112. In some examples, article 110 does not include bond coat 118. For example, first coating layer 120 may be formed directly on substrate 112. Article 110 may not include bond coat 118 when the layer on substrate 112 (e.g., first coating layer 120) and substrate 112 are sufficiently chemically and/or mechanically compatible. For example, in examples where first coating layer 120 and substrate 112 adhere sufficiently strongly to each other, article 110 may not include bond coat 118. Additionally, in examples where the coefficients of thermal expansion of substrate 112 and first coating layer 120 are sufficiently similar, article 110 may not include bond coat 118.

First coating layer 120 may be the same as or substantially similar to coating 20 described above in reference to FIG. 1. For example, first coating layer 120 may include boron doped coating layer, as described above in reference to FIG. 1.

Second coating layer 128 is on surface 132 of first coating layer 120. Second coating layer 128 may be similar to or substantially the same (e.g., the same or nearly the same) as coating 20 described in reference to FIG. 1 or, in some examples, first coating layer 120. In some examples, second coating layer 128 may include an EBC (without a boron dopant), an abradable coating, an abrasive coating, a thermal barrier coating, a self-lubricating coating, or other materials used for coating high temperature mechanical system components.

In examples in which second coating layer 128 includes an EBC, second coating layer may include one or more of the EBC materials described above in reference to FIG. 1, a mixture of stoichiometric $RE_2SiO_5$:$RE_2Si_2O_7$, or a $SiO_2$-lean RE monosilicate and/or disilicate (e.g., a composition having less $SiO_2$ than $RE_2SiO_5$ and/or $RE_2Si_2O_7$. In some examples, a $SiO_2$-lean RE monosilicate or disilicate may include between about 33.4 to 99.9 mol. % of RE oxide (e.g., $RE_2O_3$) and balance mol. % $SiO_2$.

In examples in which second coating layer 128 includes an abradable coating, the abradable coating may be configured to protect article 110, e.g., coating system 114, from physical damage, such as abrasion or impact against other components or debris. An abradable coating may be configured to be abraded, e.g., by a blade of a gas turbine engine, in order to form a relatively tight seal between article 110 and another component, such as, for example, a blade of a gas turbine engine. In some examples, abradability may include a disposition to break into relatively small pieces when exposed to a sufficient physical force. Abradability may be influenced by the material characteristics of the material(s) in the abradable coating, such as fracture toughness and fracture mechanism (e.g., brittle fracture), as well as the porosity of the abradable coating. In some examples, the abradable costing may exhibit thermal shock resistance and high-temperature capability.

The abradable coating may include any suitable material. For example, the abradable coating may include at least one of a rare-earth oxide, a rare-earth silicate, an aluminosilicate, or an alkaline earth aluminosilicate. In some examples, the abradable coating may include at least one rare-earth disilicate, mullite, BSAS, BAS, SAS, at least one rare-earth oxide, at least one rare-earth monosilicate, or combinations thereof. Additionally, or alternatively, the abradable coating may include any of the compositions described herein with respect to the EBC.

In examples in which second coating layer 128 includes a TBC, the TBC may have a low thermal conductivity (i.e., both/either an intrinsic thermal conductivity of the material(s) that forms the TBC and/or an effective thermal conductivity of the TBC as constructed) to provide thermal insulation to substrate 112, bond coat 118, and/or layers of coating system 114. Heat is transferred through the TBC through conduction and radiation. The inclusion of rare-earth oxides such as ytterbia, samaria, lutetia, scandia, ceria, gadolinia, neodymia, europia, yttria-stabilized zirconia (YSZ), zirconia stabilized by a single or multiple rare-earth oxides, hafnia stabilized by a single or multiple rare-earth oxides, zirconia-rare-earth oxide compounds, such as $RE_2Zr_2O_7$ (where RE is a rare-earth element), hafnia-rare-earth oxide compounds, such as $RE_2Hf_2O_7$ (where RE is a rare-earth element), and the like as dopants may help decrease the thermal conductivity (by conduction) of the TBC.

In some examples, a boron doped coating layer may include a graded chemistry and/or graded porosity. For example, a graded boron doped coating layer may include a horizontally graded coating layer having a boron dopant or a vertically graded coating layer having a boron dopant. In some examples, the grading may include a graded constituent of the coating layer. For example, a horizonal graded coating layer may include higher volume percent RE disilicate at or near a bond coat relative to a volume percent RE disilicate at other portions of the coating layer and/or a lower volume percent of RE monosilicate at or near a bond coat relative to a volume percent RE monosilicate at other portions of the coating layer.

Figure 3:
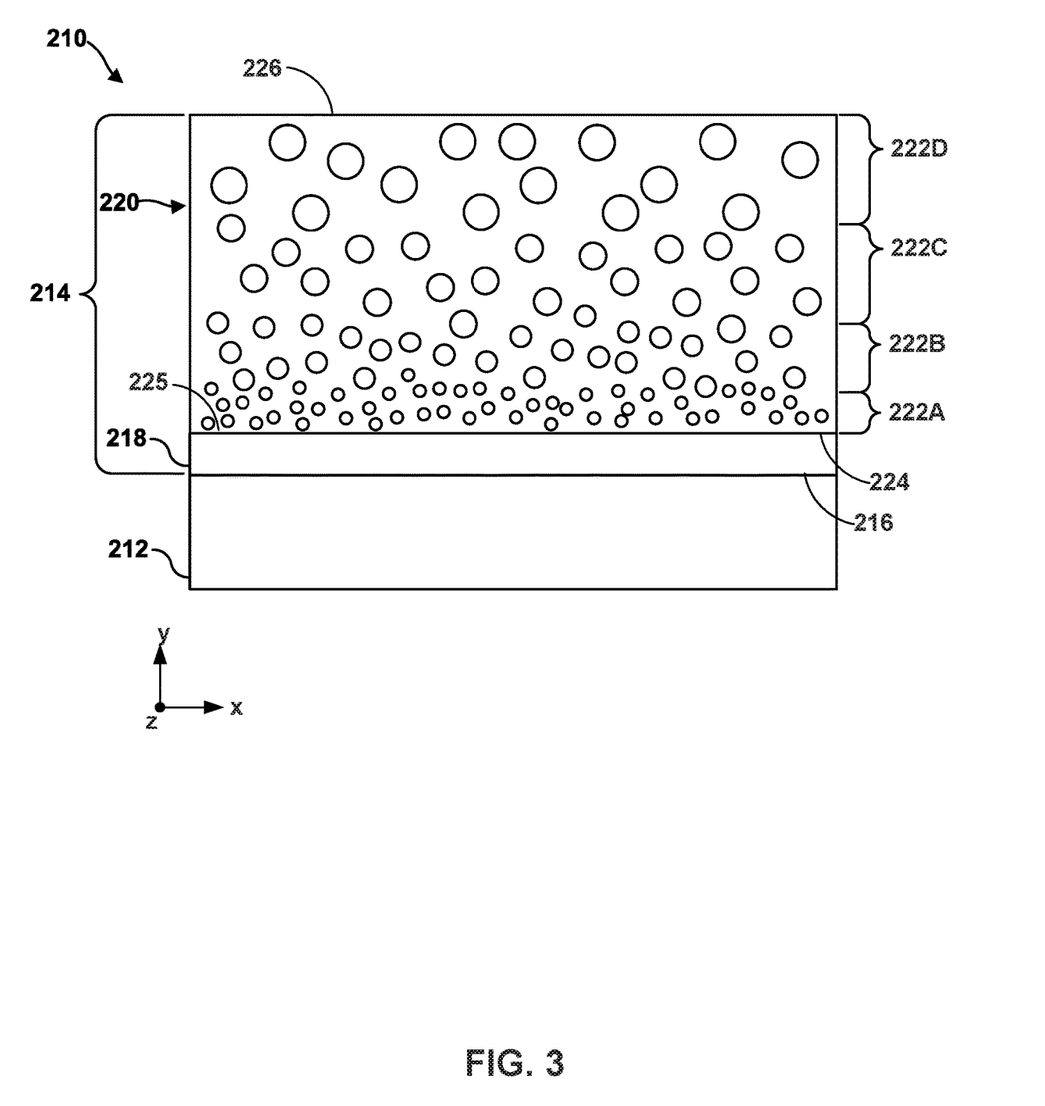
FIG. 3 is a conceptual diagram illustrating a cross-sectional view of an example component that includes a substrate and a coating system that includes a vertically graded coating layer having a boron dopant.

In some examples, a coating system may include vertically adjacent portions (e.g., adjacent in the y-direction) of a coating layer selected to control a microstructure or chemistry of the coating system to improve a functionality at a selected portion of a component, such as a selected portion of a surface of the component. FIG. 3 is a conceptual diagram illustrating a cross-sectional view of an example component 210 that includes a substrate 212 and a coating system 214 that includes a vertically graded coating layer 120 having a boron dopant. Component 210 may be the same as or substantially similar to components 10 and/or 110 discussed above in reference to respective FIGS. 1 and 2, expect for the differences described herein.

Component 210 includes bond coat 218 form on surface 216 of substrate 212 and coating 220 formed on surface 224 of bond coat 218. Coating 220 is formed to define a horizonal graded chemistry. For example, coating 220 may define a plurality of layers 222A, 222B, 222C, and 222D (collectively, layers 222). Layers 22 are arranged parallel to surface 216 of substrate 212. Each layer of layers 222 and may include a selected microstructure or chemistry. For example, layers 222 may include any of the coating materials discussed above in reference to FIGS. 1 and 2.

In some examples, each layer of layers 222 may be formed by tape casting. For example, a tape including one or more layers 222 may be prepared, positioned on component 210, and sintered to define a densified coating of coating system 214. Each layer of layers 222 (and/or each segment of the plurality of adjacent segments) may include a selected microstructure or chemistry. The selected microstructures and/or chemistries may be selected to improve a functionality at a selected positions on component 210. In some examples, a tape cast coating may be formed using at least one of slurry casting, tape casting, or gel casting. For example, a slurry used to form a tape may include components or precursors of a tape (e.g., particles, a pre-gellant material, an optional gelation initiator or promoter, optional additives, or other precursors of a tape) in a solvent. Each layer of layers 222 (and/or each segment of the plurality of adjacent segments) may be separately cast or cast with other layers (and/or segments). Multiple cast layers (and/or segments) may be assembled to form the tape cast coating for positioning and sintering on component 210. The tape cast coating may be used, for example, to form coating 220 on component 210 or portions of component 210 that cannot be coated by other techniques (e.g., shadowed regions that cannot be coated by, for example, air plasma spray) Additionally or alternatively, the microstructure of a tape cast coating may be tuned by controlling the chemistry, phase distribution, and/or grain size of the starting powders, controlling the solid loading in the slurry, and/or controlling the sintering conditions.

In examples in which coating 220 includes a boron doped EBC, layers 222 may define a graded rare-earth silicate composition. For example, the boron doped EBC may include a rare-earth monosilicate and a rare-earth disilicate, where coating 220 defines a first surface 225 adjacent to bond coat 218 and a second surface 226 opposing first surface 225. Coating 220 may include a first volume percent of the rare-earth disilicate (e.g., as represented by the spheres) at or near first surface 225 that is greater than a second volume percent of the rare-earth disilicate at or near second surface 226 and/or a first volume percent of the rare-earth monosilicate at or near second surface 226 that is greater than a second volume percent of the rare-earth monosilicate at or near first surface 225. For example, the volume percent of the rare-earth disilicate may decrease from layer 222A to layer 222D, whereas the volume percent of the rare-earth monosilicate may decrease from layer 222D to layer 222A.

In some examples, the concretion of the boron dopant may be graded. For example, coating 220 may include a volume percent of the boron dopant that is greater at or near first surface 225, and a second volume percent of the boron dopant at or near second surface 226. For example, the volume percent of the boron dopant may decrease from layer 222A to layer 222D.

Figure 4:
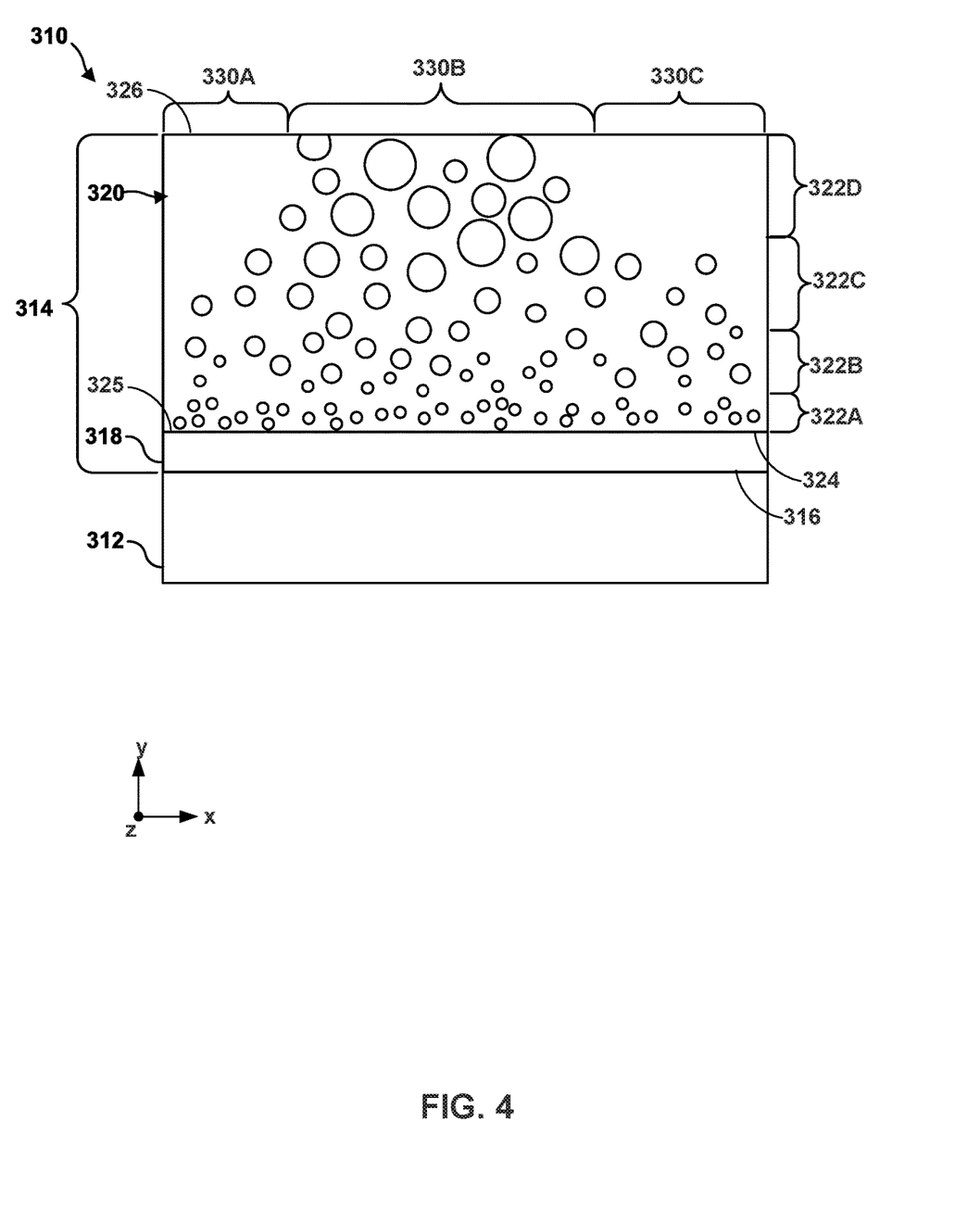
FIG. 4 is a conceptual diagram illustrating a cross-sectional view of an example component that includes a substrate and a coating system that includes a horizontally graded coating layer having a boron dopant.

Additionally or alternatively, a coating system may include horizontally adjacent regions (e.g., adjacent in the x-direction) of a coating layer selected to control a microstructure or chemistry of the coating system to improve a functionality at a selected portion of a component, such as a selected portion of a surface of the component. FIG. 4 is a conceptual diagram illustrating a cross-sectional view of an example component that includes a substrate and a coating system that includes a horizontally graded coating layer having a boron dopant. Component 210 may be the same as or substantially similar to components 10, 110, and/or 210 discussed above in reference to respective FIGS. 1, 2, and 3, expect for the differences described herein.

Component 310 includes bond coat 318 form on surface 316 of substrate 312 and coating layer 320 formed on surface 324 of bond coat 318. Coating layer 320 is formed to define a vertical graded chemistry and a horizontal graded chemistry. For example, coating layer 320 may define a plurality of horizontal layers 322A, 322B, 322C, and 322D (collectively, layers 322) and a plurality of vertical regions 330A, 330B, and 330C (collectively, regions 330). In some examples, component 310 may include regions without layers 332. Layers 322 are arranged parallel to surface 316 of substrate 312. Regions 330 are arranged normal to surface 316. Each layer of layers 322 and each region of regions 330 may include a selected microstructure or chemistry. For example, layers 322 and regions 330 may include any of the coating materials discussed above in reference to FIGS. 1 2, and 3.

In some examples, each layer of layers 322 and/or each region of regions 330 may be formed by tape casting, as described above. For example, a tape including one or more layers 322 and/or one or more regions 330 may be prepared, positioned on component 310, and sintered to define a densified coating of coating system 314.

In examples in which coating layer 320 includes a boron doped EBC, layers 222 and/or regions 330 may define a graded rare-earth silicate composition. For example, the boron doped EBC may include a rare-earth monosilicate and a rare-earth disilicate, where coating layer 320 defines a first surface 325 adjacent to bond coat 318 and a second surface 326 opposing first surface 325. Coating layer 320 may include a first volume percent of the rare-earth disilicate at or near first surface 325 (e.g., as represented by the spheres) that is greater than a second volume percent of the rare-earth disilicate at or near second surface 326 and/or a first volume percent of the rare-earth monosilicate at or near second surface 326 that is greater than a second volume percent of the rare-earth monosilicate at or near first surface 325. For example, the volume percent of the rare-earth disilicate may decrease from layer 322A to layer 322D, whereas the volume percent of the rare-earth monosilicate may decrease from layer 322D to layer 322A.

Additionally or alternatively, coating layer 320 may include a first volume percent of the rare-earth disilicate (e.g., as represented by the spheres) at or near region 330B that is greater than a second volume percent of the rare-earth disilicate at or near regions 330A and/or 330C and/or a first volume percent of the rare-earth monosilicate at or near regions 330A and/or 330C that is greater than a second volume percent of the rare-earth monosilicate at or near region 330B.

Although describe in reference to an EBC, in other example, coating layer 320 may include other types of coatings, such as, for example, an abradable coating. For example, regions 330 may define a non-continuous abradable portion of coating system 314 of a gas turbine engine shroud that includes a first portion (e.g., region 330A), a second portion (e.g., region 330C), and a blade rub portion (e.g., region 330B). Blade rub portion 330B may extend between first portion and second portion, and may be configured to be abraded, e.g., by the tips of blades of a gas turbine engine, in order to form a relatively tight seal between component 310 and the blades. An abradability of blade rub portion 330B may include a disposition to break into relatively small pieces, granules, or powder, when exposed to a sufficient physical force. Abradability may be influenced by the material characteristics of the material forming blade rub portion 330B of coating system 314, such as fracture toughness and fracture mechanism (e.g., brittle fracture) and/or the porosity of the blade rub portion 330B. In this way, a portion of coating system 314 over a region of component 310 may be controlled by application of different regions 330 via casting to improve mechanical and/or chemical properties of the portion of coating system 314.

Figure 5:
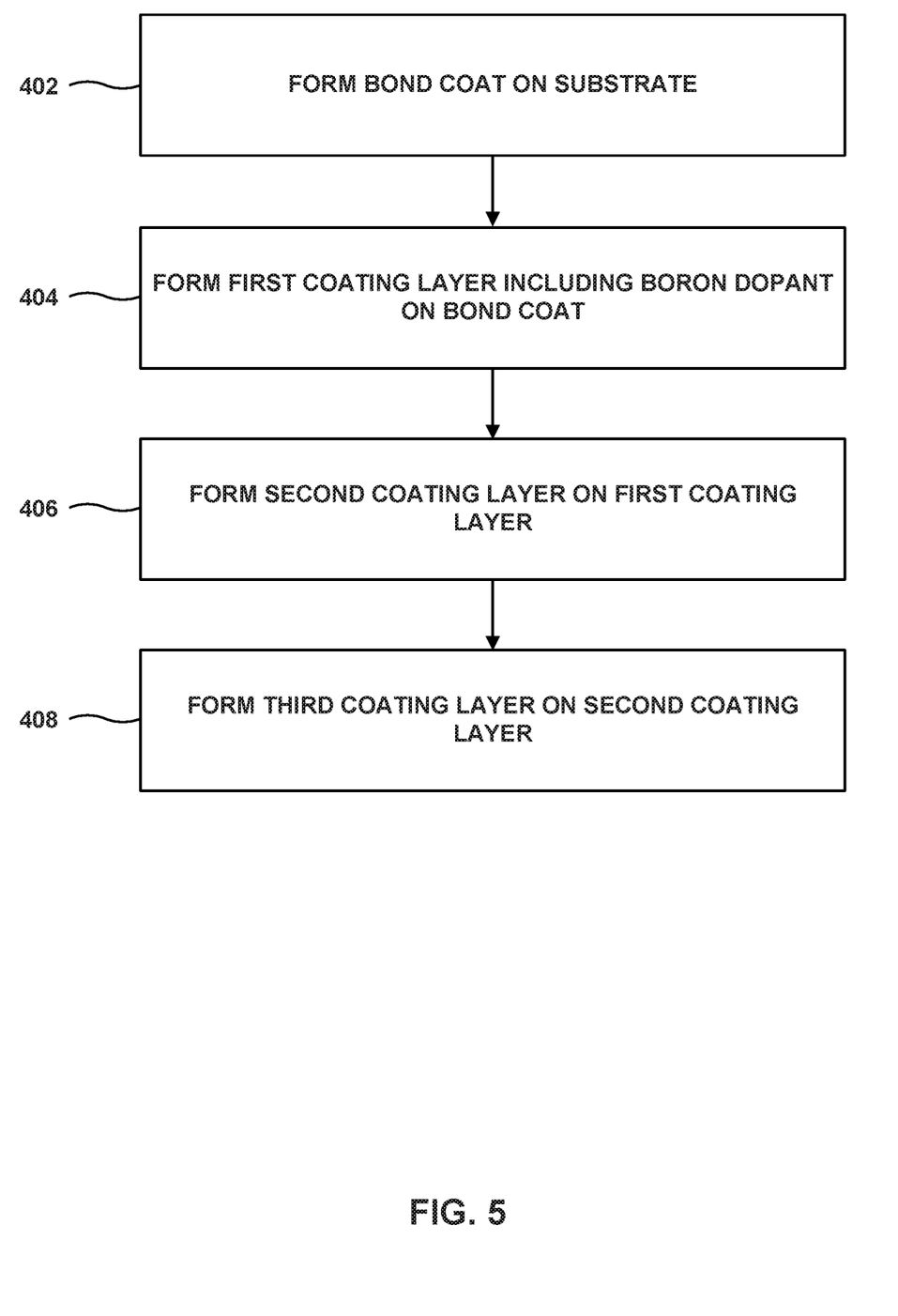
FIG. 5 is a flow diagram illustrating an example technique for forming an article that includes a substrate and a coating system that includes a coating layer having a boron dopant.

The coating systems including a boron doped coating layer described herein may be formed using any suitable manufacturing technique. FIG. 5 is a flow diagram illustrating an example technique for forming an example coating system including a boron doped coating layer. The technique illustrated in FIG. 5 will be described with respect to article 110 of FIG. 2. However, the technique illustrated in FIG. 5 may be used to form other articles, and article 110 may be formed using other techniques.

In some examples, the technique optionally includes forming bond coat 118 on substrate 112 (402). Bond coat 118 may be formed on surface 116 of substrate 112 using a thermal spray technique such as plasma spraying; PVD, such as EB-PVD or DVD; CVD; cathodic arc deposition; slurry deposition; sol-gel deposition; electrophoretic deposition; or the like. In some examples, article 110 may not include bond coat 118, and the technique may not include forming bond coat 118 on substrate 112 (402).

The technique includes forming coating layer 120 having a boron dopant on bond coat 118 (or substrate 112 if bond coat 118 is not present) (404). Coating layer 120 may be formed using, for example, a thermal spray technique such as plasma spraying; PVD, such as EB-PVD or DVD; CVD; cathodic arc deposition; slurry deposition; sol-gel deposition; electrophoretic deposition; slurry casting; tape casting; gel casting; or the like. In examples in which coating layer 120 includes a graded chemistry, forming coating layer 120 may include controlling an amount of at least one coating material applied by, for example, thermal spraying. For example, an amount of boron dopant or silicate may be controlled during thermal spraying to produce a graded chemistry. Additionally or alternatively, a graded chemistry may be formed by tape casting.

In examples in which forming coating layer includes tape casting, the technique may include forming a tape defining at least coating layer and/or segment (e.g., layers 322 and/or regions 330, illustrated in FIG. 4). For example, forming the tape may include applying, by a tape casting system, a first slurry containing the first coating material to a carrier film and applying, by the tape casting system, a second slurry containing the second coating to the carrier film adjacent to the first slurry. In some examples, forming the tape may include assembling the tape to position horizontally or vertically adjacent layers relative to one another. In some examples, forming the tape may include at least partially sintering the tape and/or infiltrating cracks to reduce a porosity of the tape. After forming the tape, the technique may include positioning the tape on a surface of a substrate 112 or bond coat 118, such as, for example, to define horizontally adjacent regions or vertically adjacent layers or on a portion of substrate 120 that would be shadowed in a thermal spray process. After positioning the tape, the technique may include heating the tape to sinter a constituent of at least one of the tape to form a densified coating, such as, to a temperature between about 1200° C. and about 1600° C., such as between about 1327° C. and about 1427° C.

The technique optionally includes forming second coating layer 128 on first coating layer 120 (406). Second coating layer 128 may be formed using, for example, a thermal spray technique such as plasma spraying; PVD, such as EB-PVD or DVD; CVD; cathodic arc deposition; slurry deposition; sol-gel deposition; electrophoretic deposition; slurry casting; tape casting; gel casting; or the like.

The technique optionally includes forming third coating layer 130 on second coating layer 128 (408). Third coating layer 130 may be formed using, for example, a thermal spray technique such as plasma spraying; PVD, such as EB-PVD or DVD; CVD; cathodic arc deposition; slurry deposition; sol-gel deposition; electrophoretic deposition; slurry casting; tape casting; gel casting; or the like.

The following clause illustrate example subject matter described herein:

Clause 1. An article comprising: a substrate defining a surface; a bond coat on the surface of the substrate; and a coating layer on the bond coat, wherein the coating layer comprises a boron dopant configured to inhibit crystallization of amorphous silicon dioxide thermally grown oxide on the bond coat at an operating temperature of the article.

Clause 2. The article of clause 1, wherein the boron dopant comprises $MBO_3$, where M comprises at least one of Al, Hf, Zr, Ta, one or more rare-earth metals, Y, or Sc.

Clause 3. The article of clause 1 or 2, wherein the boron dopant comprises $MBSiO_5$, where M comprises at least one of Al, Hf, Zr, Ta, one or more rare-earth metals, Y, or Sc.

Clause 4. The article of any one of clauses 1 through 3, wherein the boron dopant comprises $MBSi_2O_7$, where M comprises at least one of Al, Hf, Zr, Ta, one or more rare-earth metals, Y, or Sc.

Clause 5. The article of any one of clauses 1 through 4, wherein the coating layer comprises an environmental barrier coating (EBC) further comprising at least one rare-earth monosilicate or rare-earth disilicate.

Clause 6. The article of clause 5, wherein the boron dopant is unreactive with the at least one rare-earth monosilicate or a rare-earth disilicate.

Clause 7. The article of any one of clauses 1 through 6, wherein the coating layer further comprises a second dopant comprising at least one of $Al_2O_3$, $Fe_2O_3$, $Fe_3O_4$, $RE_2O_3$, $Ta_2O_5$, $HfO_2$, $ZrO_2$, or $LiREO_2$, where RE is at least one of a rare-earth metal, Y, or Sc.

Clause 8. The article of any one of clauses 1 through 7, further comprising at least one EBC on the coating layer, wherein the at least one EBC comprises at least one rare-earth monosilicate or rare-earth disilicate.

Clause 9. The article of any one of clauses 1 through 8, further comprising an abradable coating on the coating layer or the EBC, wherein the abradable coating comprises at least one rare-earth monosilicate or rare-earth disilicate.

Clause 10. The article of any one of clauses 1 through 9, wherein the coating layer comprises graded chemistry, a graded porosity, or a graded chemistry and a graded porosity.

Clause 11. The article of any one of clauses 1 through 10, wherein the coating layer further comprises a rare-earth monosilicate and a rare-earth disilicate, wherein the coating layer defines a first surface adjacent to the bond coat and a second surface opposing the first surface, wherein a first volume percent of the rare-earth disilicate at the first surface is greater than a second volume percent of the rare-earth disilicate at the second surface, and wherein a first volume percent of the rare-earth monosilicate at the second surface is greater than a second volume percent of the rare-earth monosilicate at the first surface.

Clause 12. The article of any one of clauses 1 through 11, wherein the coating layer further comprises a rare-earth monosilicate and a rare-earth disilicate, wherein the coating layer defines a first region and a second region laterally adjacent to the first region, wherein a first volume percent of the rare-earth disilicate in the first region is greater than a second volume percent of the rare-earth disilicate in the second region, and wherein a first volume percent of the rare-earth monosilicate in the second region is greater than a second volume percent of the rare-earth disilicate in the first region.

Clause 13. The article of any one of clauses 1 through 12, wherein the article is a high temperature component of a gas turbine engine.

Clause 14. The article of any one of clauses 1 through 13, wherein the operating temperature of the article is less than about 1982° C.

Clause 15. A coating system of a gas turbine engine component comprising: a bond coat on a surface of a ceramic matrix composite defining the gas turbine engine component; and a coating layer on the bond coat, wherein the coating layer comprises a boron dopant, wherein the boron dopant is configured to inhibit crystallization of amorphous silicon dioxide thermally grown oxide on the bond coat at an operating temperature of the article.

Clause 16. The coating system of clause 15, wherein the gas turbine engine component comprises the article of any one of clauses 1 through 15.

Clause 17. The coating system of clause 15, wherein the boron dopant comprises at least one of MBO3, MBSiO5, MBSi2O7, where M is at least one of Al, Hf, Zr, Ta, one or more rare-earth metals, Y, or Sc.

Clause 18. The coating system of clause 15 or 16, wherein the coating layer is an environmental barrier coating (EBC) further comprising at least one rare-earth monosilicate or rare-earth disilicate.

Clause 19. A method comprising: depositing a bond coat on a surface of a substrate defining an article; depositing a coating layer on the bond coat, wherein the coating layer comprises a boron dopant, wherein the boron dopant is configured to inhibit crystallization of amorphous silicon dioxide thermally grown oxide on the bond coat at an operating temperature of the article.

Clause 20. The method of clause 19, wherein the article comprises the article of any one of clauses 1 through 15.

Clause 21. The method of clause 19 or 20, further comprising depositing on the coating layer at least one of an EBC or an abradable coating.

Clause 22. The method of any one of clauses 19 through 21, wherein the coating layer further comprises a rare-earth monosilicate and a rare-earth disilicate, and wherein depositing the coating layer comprises: depositing at a first surface adjacent to the bond coat a first volume percent of the rare-earth disilicate and a first volume percent of the rare-earth monosilicate and depositing at a second surface opposing the first surface a second volume percent of the rare-earth monosilicate and a second volume percent of the rare-earth disilicate, wherein the first volume percent of the rare-earth disilicate at the first surface is greater than the second volume percent of the rare-earth disilicate at the second surface, and wherein the first volume percent of the rare-earth monosilicate at the second surface is greater than the second volume percent of the rare-earth monosilicate at the first surface; or depositing in a first region of the coating layer, wherein the first region of the coating layer comprises a first volume percent of the rare-earth disilicate and a first volume percent of the rare-earth monosilicate, and depositing a second region of the coating layer laterally adjacent to the first region, wherein the second region of the coating layer comprises a second volume percent of the rare-earth monosilicate and a second volume percent of the rare-earth disilicate, wherein the first volume percent of the rare-earth disilicate in the first region is greater than the second volume percent of the rare-earth disilicate in the second region, and wherein the first volume percent of the rare-earth monosilicate in the second region is greater than the second volume percent of the rare-earth disilicate in the first region.

Various examples have been described. These and other examples are within the scope of the following claims.

What is claimed is:

1. An article comprising:
a substrate defining a surface;
a silicon-containing bond coat on the surface of the substrate; and
a barrier coating comprising a coating layer on the silicon-containing bond coat, wherein the coating layer comprises an environmental barrier coating (EBC) comprising:
an EBC material comprising at least one rare-earth monosilicate or rare-earth disilicate; and
a boron dopant dispersed in the EBC material and configured to inhibit crystallization of amorphous silicon dioxide of a thermally grown oxide (TGO) layer on the surface of the CMC substrate at an operating temperature of the gas turbine engine component,
wherein the boron dopant comprises at least one of $MBO_3$, $MBSiO_5$, or $MBSi_2O_7$,
wherein M comprises at least one of Al, Ta, one or more rare-earth metals, Y, or Sc, and
wherein the boron dopant is substantially unreactive with the amorphous silicon dioxide of the TGO layer and the at least one rare-earth monosilicate or rare-earth disilicate of the EBC material.

2. The article of claim 1, wherein the boron dopant comprises $MBO_3$.

3. The article of claim 1, wherein the boron dopant comprises $MBSiO_5$.

4. The article of claim 1, wherein the boron dopant comprises $MBSi_2O_7$.

5. The article of claim 1, wherein the coating layer further comprises a second dopant comprising at least one of $Al_2O_3$, $Fe_2O_3$, $Fe_3O_4$, $RE_2O_3$, $Ta_2O_5$, $HfO_2$, $ZrO_2$, or $LiREO_2$, where RE is at least one of a rare-earth metal, Y, or Sc.

6. The article of claim 1, wherein the barrier coating further comprises at least one additional EBC on the coating layer, wherein the at least one additional EBC comprises at least one rare-earth monosilicate or rare-earth disilicate.

7. The article of claim 1, wherein the barrier coating further comprises an abradable coating on the coating layer, wherein the abradable coating comprises at least one rare-earth monosilicate or rare-earth disilicate.

8. The article of claim 1, wherein the coating layer comprises graded chemistry, a graded porosity, or a graded chemistry and a graded porosity.

9. The article of claim 1, wherein the coating layer defines a first surface adjacent to the silicon-containing bond coat and a second surface opposing the first surface, wherein a first volume percent of the rare-earth disilicate at the first surface is greater than a second volume percent of the rare-earth disilicate at the second surface, and wherein a first volume percent of the rare-earth monosilicate at the second surface is greater than a second volume percent of the rare-earth monosilicate at the first surface.

10. The article of claim 1, wherein the coating layer defines a first region and a second region laterally adjacent to the first region, wherein a first volume percent of the rare-earth disilicate in the first region is greater than a second volume percent of the rare-earth disilicate in the second region, and wherein a first volume percent of the rare-earth monosilicate in the second region is greater than a second volume percent of the rare-earth disilicate in the first region.

11. The article of claim 1, wherein the article is a high temperature component of a gas turbine engine.

12. The article of claim 1, wherein the operating temperature of the article is less than about 1982° C.

13. A gas turbine engine component comprising:
   a ceramic matrix composite (CMC) substrate defining the gas turbine engine component, wherein the CMC substrate comprises a silicon-containing material; and
   a barrier coating comprising a coating layer on a surface of the CMC, wherein the coating layer comprises an environmental barrier coating (EBC) comprising:
      an EBC material comprising at least one rare-earth monosilicate or rare-earth disilicate; and
      a boron dopant dispersed in the EBC material and configured to inhibit crystallization of amorphous silicon dioxide of a thermally grown oxide (TGO) layer on the surface of the CMC substrate at an operating temperature of the gas turbine engine component,
   wherein the boron dopant comprises at least one of $MBO_3$, $MBSiO_5$, or $MBSi_2O_7$,
   wherein M comprises at least one of Al, Ta, one or more rare-earth metals, Y, or Sc, and
   wherein the boron dopant is substantially unreactive with the amorphous silicon dioxide of the TGO layer and the at least one rare-earth monosilicate or rare-earth disilicate of the EBC material.

14. The gas turbine engine component of claim 13, wherein the coating layer comprises at least one additional EBC comprising at least one rare-earth monosilicate or rare-earth disilicate.

15. A method comprising:
   depositing a silicon-containing bond coat on a surface of a substrate defining an article; and
   depositing a barrier coating comprising a coating layer on the silicon-containing bond coat, wherein the coating layer comprises an environmental barrier coating (EBC) comprising:
      an EBC material comprising at least one rare-earth monosilicate or rare-earth disilicate; and
      a boron dopant dispersed in the EBC material and configured to inhibit crystallization of amorphous silicon dioxide of a thermally grown oxide (TGO) layer on the silicon-containing bond coat at an operating temperature of the article,
   wherein the boron dopant comprises at least one of $MBO_3$, $MBSiO_5$, or $MBSi_2O_7$,
   wherein M comprises at least one of Al, Ta, one or more rare-earth metals, Y, or Sc, and
   wherein the boron dopant is unreactive with the amorphous silicon dioxide of the TGO layer and the at least one rare-earth monosilicate or rare-earth disilicate of the EBC material.

16. The method of claim 15, further comprising depositing on the coating layer at least one of an additional EBC or an abradable coating.

17. The method of claim 15, wherein depositing the coating layer comprises:
   depositing at a first surface adjacent to the silicon-containing bond coat a first volume percent of the rare-earth disilicate and a first volume percent of the rare-earth monosilicate and depositing at a second surface opposing the first surface a second volume percent of the rare-earth monosilicate and a second volume percent of the rare-earth disilicate, wherein the first volume percent of the rare-earth disilicate at the first surface is greater than the second volume percent of the rare-earth disilicate at the second surface, and wherein the first volume percent of the rare-earth monosilicate at the second surface is greater than the second volume percent of the rare-earth monosilicate at the first surface; or
   depositing in a first region of the coating layer, wherein the first region of the coating layer comprises a first volume percent of the rare-earth disilicate and a first volume percent of the rare-earth monosilicate, and depositing a second region of the coating layer laterally adjacent to the first region, wherein the second region of the coating layer comprises a second volume percent of the rare-earth monosilicate and a second volume percent of the rare-earth disilicate, wherein the first volume percent of the rare-earth disilicate in the first region is greater than the second volume percent of the rare-earth disilicate in the second region, and wherein the first volume percent of the rare-earth monosilicate in the second region is greater than the second volume percent of the rare-earth disilicate in the first region.

* * * * *